(12) United States Patent
Kim

(10) Patent No.: US 12,179,433 B2
(45) Date of Patent: Dec. 31, 2024

(54) 3D OBJECT CONTAINING CBD AND PRINTING OPERATING SYSTEM THEREFOR

(71) Applicant: BIO MEDICAL 3D PRINTING CO., LTD., Seoul (KR)

(72) Inventor: Namsoo Kim, Seoul (KR)

(73) Assignee: Bio Medical 3D Printing Co., Ltd., Seoul (KR)

( * ) Notice: Subject to any disclaimer, the term of this patent is extended or adjusted under 35 U.S.C. 154(b) by 451 days.

(21) Appl. No.: 17/617,421

(22) PCT Filed: Jun. 16, 2020

(86) PCT No.: PCT/KR2020/007759
§ 371 (c)(1),
(2) Date: Dec. 8, 2021

(87) PCT Pub. No.: WO2020/256371
PCT Pub. Date: Dec. 24, 2020

(65) Prior Publication Data
US 2022/0242050 A1    Aug. 4, 2022

(30) Foreign Application Priority Data

Jun. 18, 2019  (KR) ......................... 10-2019-0072109
May 25, 2020  (KR) ......................... 10-2020-0062177

(51) Int. Cl.
*B29C 64/393*   (2017.01)
*A23L 2/52*     (2006.01)
(Continued)

(52) U.S. Cl.
CPC .............. *B29C 64/393* (2017.08); *A23L 2/52* (2013.01); *A23L 33/105* (2016.08);
(Continued)

(58) Field of Classification Search
None
See application file for complete search history.

(56) References Cited

U.S. PATENT DOCUMENTS 9,854,828 B2 * 1/2018 Langeland ............. B33Y 30/00
10,449,310 B2 * 10/2019 Jackson ............. A61B 5/14532
(Continued)

FOREIGN PATENT DOCUMENTS

CA       2849124 A1 *  4/2013   .............. A23P 1/085
JP     2005507723 A  *  3/2005   .............. A23L 33/16
(Continued)

OTHER PUBLICATIONS

Namsoo et al., "Unique Approach of a Telemedicine System for CBD-Infused Foods", Apr. 2021, Processes 2021, 9, 936. https://doi.org/10.3390/pr9060936. (Year: 2021).*

(Continued)

*Primary Examiner* — Mohammad Ali
*Assistant Examiner* — Kelvin Booker
(74) *Attorney, Agent, or Firm* — BROADVIEW IP LAW, PC

(57) ABSTRACT

The present invention relates to a printing operating system for a 3D object containing CBD, the system providing a printing operating method for a 3D object, whereby CBD-containing food, such as coffee, juice, syrup, sauce, ice cream, yogurt, chocolate, cookies, candy, etc., or CBD-containing products using a fluid, such as candles, soaps, cosmetics, oils, etc., are provided by being printed into various and distinctive shapes catering to consumer preferences, while quantitative control and verification are enabled so that the 3D object contains an amount of CBD which is legally allowed in each country. The system implements a teleportation concept-based drug delivery method enabling contactless remote diagnosis and, at the same time, delivery (Continued)

of drugs such as CBD in an emergency situation such as the prevalence of coronaviruses (such as COVID-19) or various infectious diseases.

14 Claims, 7 Drawing Sheets

(51) Int. Cl.
| | |
|---|---|
| *A23L 33/10* | (2016.01) |
| *A23L 33/105* | (2016.01) |
| *B29C 64/106* | (2017.01) |
| *B29C 64/209* | (2017.01) |
| *B33Y 50/02* | (2015.01) |
| *B33Y 10/00* | (2015.01) |
| *B33Y 30/00* | (2015.01) |
| *B33Y 70/00* | (2020.01) |
| *B33Y 80/00* | (2015.01) |

(52) U.S. Cl.
CPC .......... *B29C 64/106* (2017.08); *B29C 64/209* (2017.08); *B33Y 50/02* (2014.12); *B33Y 10/00* (2014.12); *B33Y 30/00* (2014.12); *B33Y 70/00* (2014.12); *B33Y 80/00* (2014.12)

(56) References Cited

U.S. PATENT DOCUMENTS

| | | | | |
|---|---|---|---|---|
| 2016/0088870 A1* | 3/2016 | Langeland | .............. | A23P 30/20 425/375 |
| 2016/0120808 A1* | 5/2016 | Hoover | ................. | B33Y 50/00 427/2.14 |
| 2016/0279073 A1 | 9/2016 | Full | | |
| 2016/0342769 A1* | 11/2016 | DeCiccio | ............... | G16H 70/40 |
| 2019/0371477 A1* | 12/2019 | DeCiccio | .............. | G16H 70/40 |
| 2023/0065458 A1* | 3/2023 | Abadi | .................... | G16H 40/67 |

FOREIGN PATENT DOCUMENTS

| | | | | | |
|---|---|---|---|---|---|
| JP | 2016-537412 | A | | 12/2016 | |
| KR | 100543507 | B1 * | | 1/2006 | ......... H01L 31/0224 |
| KR | 10-2013-0011345 | A | | 1/2013 | |
| KR | 1020150078774 | A | | 7/2015 | |
| KR | 1020150110924 | A | | 10/2015 | |
| KR | 1020160094950 | A | | 8/2016 | |
| KR | 1020190017372 | A | | 2/2019 | |
| WO | WO-2014188079 | A1 * | | 11/2014 | ............. A23L 33/16 |
| WO | 2018/234874 | A1 | | 12/2018 | |
| WO | WO-2020227130 | A1 * | | 11/2020 | ............. A21D 13/28 |
| WO | WO-2020256371 | A2 * | | 12/2020 | ............. G06Q 50/04 |
| WO | WO-2021127667 | A1 * | | 6/2021 | ............. A61K 45/06 |
| WO | WO-2022256735 | A1 * | | 12/2022 | ............... A21D 2/36 |

OTHER PUBLICATIONS

Wimmer-Teubenbacher et al., "Pharmaceutical-grade oral films as substrates for printed medicine", Feb. 2018, International Journal of Pharmaceutics 547 (2018) 169-180. (Year: 2018).*

Öbloma et al., "Data-enriched edible pharmaceuticals (DEEP) of medical cannabis by inkjet printing", Jul. 2020, International Journal of Pharmaceutics 589 (2020) 119866. (Year: 2020).*

Karavasili et al., "Mucosal drug delivery and 3D printing technologies: A focus on special patient populations", Apr. 2021, Advanced Drug Delivery Reviews 176 (2021) 113858. (Year: 2021).*

Office Action for JP2021-569852 by Japan Patent Office dated Jan. 31, 2023.

Non-Final Office Action for KR 10-2020-0062177 by Korean Intellectual Property Office dated May 24, 2022.

* cited by examiner

3D OBJECT CONTAINING CBD AND PRINTING OPERATING SYSTEM THEREFOR

CROSS-REFERENCE TO RELATED APPLICATIONS

This application is the U.S. National Stage filing under 35 U.S.C. 371 of International Application No. PCT/KR2020/007759, filed on Jun. 16, 2020, which claims priority to Korean Patent Application No. 10-2020-0062177, filed on May 25, 2020, and Korean Patent Application No. 10-2019-0072109, filed on Jun. 18, 2019, all of which are hereby incorporated by reference in their entirety.

TECHNICAL FIELD

The present invention relates to a 3D printing system, and more particularly, to a system for providing CBD (Cannabidiol)-containing products using a fluid such as food and the like through 3D printing.

BACKGROUND ART

A sensation for CBD obtained by removing THC (Delta-9-tetrahydrocannabinol), which is a hallucinogenic component, from cannabis has begun to hit the global market. CBD is one of the cannabinoids contained in the cannabis plants, and while many plants naturally have the same, plant containing CBD are found only in a limited number of herbs including hemp. THC has a main psychoactive component of the cannabis plant, and CBD and THC have similar chemical structures but have different structural arrangements. As a result, it is accepted as orthodoxy that THC has a psychoactive effect, whereas CBD does not. Related studies show that CBD is good for inflammation and neuropathic pain, while THC is good for cramps and cramp-related pain but has side effects leading to hallucinations, so it must be added in very small amounts and managed. THC is evaluated as a dangerous drug that gives an immediate response when taken and has long-term cognitive side effects. However, CBD makes a variant with different ratios of CBD and THC to minimize the side effects of psychological activity opposite the mental stimulus of THC. Unlike CBD, THC is classified as a dangerous drug, and requires measures to manage the same. 31 states in the United States, Canada, Australia, New Zealand, and EU countries already allow the medical use of CBD and further allow CBD at tobacco and alcohol levels as the recreational use of products from which the content of THC is removed or having a low level of THC for the public, and such countries are increasing. This interest makes an attempt to apply new applications from smoking and patches to food according to people's interest. Starting in Colorado, USA in April 2019, it is spreading with the international Weed Day.

However, in application thereof to the food field, it is necessary to improve the content control of CBD, user confirmation, and an individual intake method according thereto.

DISCLOSURE OF INVENTION

Technical Problem

Accordingly, the present invention has been made in order to solve the aforementioned problems, and an aspect of the present invention is to provide a 3D printing operating system capable of providing CBD-containing foods, such as coffee, juice, syrup, sauce, ice cream, yogurt, chocolate, cookies, candies, etc., or CBD-containing products using a fluid, such as candles (scented candles), soaps, cosmetics, oils, etc., by printing the same into various and distinctive shapes catering to consumer preferences, while enabling quantitative control and verification so as to contain an amount of CBD legally allowed in each country.

Solution to Problem

First, to summarize the features of the present invention, a 3D printing operating system according to one aspect of the present invention in order to solve the above problems may include: an authentication unit configured to perform user authentication for determining whether or not to allow services for corresponding user information or specialist prescription information according to a request from a user terminal; a CBD notification unit configured to transmit CBD content-related information produced on the basis of the user information or specialist prescription information to the user terminal so that the user terminal transmits job data including the CBD content-related information to a remote 3D printer through a network, and control printing to produce an object having a corresponding CBD content using a fluid; a communication support unit configured to support the exchange of two-way remote communication information, including voice or text, between a specialist terminal and the user terminal while the 3D printer produces the object; and an interface unit configured to manage a history of the use and effect of the CBD-containing object produced by the 3D printer corresponding to a causal symptom for each user in a database, analyze the use and effect of the CBD-containing object of a specific user or users for each causal symptom according to a request for statistic, and provide statistical information.

The authentication unit may perform the user authentication by identifying whether or not user identification information included in the request matches the user information or specialist prescription information, and perform additional authentication through communication with a management agency server.

The CBD notification unit may transmit, as the CBD content-related information, information including a weight ratio of CBD in the fluid for producing the object or a volume of the fluid when the CBD content of the fluid is known in advance.

The fluid for producing the object may contain 0.001 wt % to 95.0 wt % of CBD.

The fluid for producing the object may contain 0.0 wt % to 10.0 wt % of THC.

The communication support unit may extract, as the two-way remote communication information, a description of the use and effect of the CBD-containing object corresponding to the user's causal symptom with reference to the database, provide the same to the user terminal, and support interactive exchange of question and answer information about the symptom improvement status of the user between the specialist terminal and the user terminal.

The 3D printer may include: a printer device configured to discharge a material through a nozzle of a discharge unit coupled to an xy driving unit according to a control signal; a control device configured to generate the control signal so that the printer device produces an object on a bed in which a keep-warm/keep-cold mechanism is installed according to the job data ordered through the user terminal; and a camera configured to obtain an image of the process of producing the object, and the control device may execute the job data by interworking with the user terminal according to the relay of the CBD notification unit of the platform on the network, provide the image of the process of producing the object to the user terminal in real time, control the interface unit of the platform to provide analysis information on the process of producing the object to the user terminal in real time, and control one or more of x-axis or y-axis movement of the discharge unit, z-axis movement of the bed, a change in the discharge material, and operation stop according to a control command received from the user terminal.

The control device may control the movement of the discharge unit according to digital data on pictures, design, photos, text, or information input by writing or drawing by hand, as 3D job data, so as to discharge, through the discharge unit, the CBD-containing fluid on the bed or further discharge the same on a predetermined substructure, thereby producing the object.

A fluid feeder to supply the CBD-containing fluid through the discharge unit may be further included, and the discharge unit may discharge the CBD-containing fluid through a nozzle in a PTE (Piston Type Extrusion) or STE (Screw Type Extrusion) method.

The material of the fluid feeder for supplying the CBD-containing fluid through the discharge unit and fluid receiving means from the fluid feeder to the nozzle may be made of plastic to prevent loss of CBD in the movement path of the CBD-containing fluid.

The CBD-containing fluid used for producing the object in the 3D printer may be obtained by a supercritical carbon dioxide extraction method, and may contain animal or vegetable fat for a predetermined micelle or reverse micelle action.

In the 3D printer, the object may be produced using a CBD-containing fluid on coffee in which a foam is formed on the coffee by a predetermined thickness or more.

In the 3D printer, the object, which is food, may be produced using a CBD-containing fluid on other foods.

In the 3D printer, the object may be produced using a CBD-containing fluid on the food in which a heat transfer barrier layer having a predetermined thickness or more is formed on the food.

In addition, a 3D printing operating method in a cloud operation platform according to another aspect of the present invention may include: performing user authentication for determining whether or not to allow services for corresponding user information or specialist prescription information according to a request from a user terminal; transmitting CBD content-related information produced on the basis of the user information or specialist prescription information to the user terminal so that the user terminal transmits job data including the CBD content-related information to a remote 3D printer through a network and controlling printing to produce an object having a corresponding CBD content using a fluid; supporting the exchange of two-way remote communication information, including voice or text, between a specialist terminal and the user terminal while the 3D printer produces the object; and managing a history of the use and effect of the CBD-containing object produced by the 3D printer corresponding to a causal symptom for each user in a database, analyzing the use and effect of the CBD-containing object of a specific user or users for each causal symptom according to a request for statistic, and providing statistical information.

The objects containing the CBD may include food, candles, soaps, cosmetics, or oils.

Advantageous Effects of Invention

According to a 3D printing operating system of the present invention, it is possible to provide CBD-containing foods, such as coffee, juice, syrup, sauce, ice cream, yogurt, chocolate, cookies, candies, pretzels, pastas, etc., or CBD-containing products using a fluid, such as candles (scented candles), soaps, cosmetics, oils, etc., by printing the same into various and distinctive shapes catering to consumer preferences, while enabling quantitative control and verification so as to contain an amount of CBD legally allowed in each country. For example, when adding CBD ingredients that may be misused to food or the like, it is possible to share and manage, depending on the environment, information such as users, managers, and families in relation to whether or not the user and the manager use the effective and right amount of CBD, how much CBD is used maximally including overdose, and the like using the Internet of things (IoT) system in a 3D printer, and to alleviate unnecessary misunderstandings and reluctance in the process of injection into the elderly or children by adding the right amount of CBD to a fluid, instead of absorbing and taking an inaccurate amount for one dose using a patch or dropper, thereby making it easy to recognize the accurate amount of use. That is, the CBD-containing fluid can be verified at the production site of the 3D objects in conjunction with the IoT system, and, in particular, information transmission and control are possible such that the right amount of CBD is to be contained even for the neglected class of people such as children or the elderly and even in remote locations far away between countries or regions, thereby enabling effective control by the government or the like.

In addition, it is possible to print and eat CBD-containing foods anytime and anywhere and to prevent situations in which CBD may be misused using a technique in which information thereof is stored in a cloud server and a prescribed amount to be taken for one dose can be accurately controlled by the recommendation of specialists who agree to access the information, such as doctors, pharmacists, families, and the like, which makes it possible to focus on the function of nutraceuticals rather than drugs. In addition, information on the foods and the like repeatedly consumed and feedback information thereof are provided through a mounted panel during the printing time. Even if a dosage per day is determined by a doctor's prescription, there is a risk of abuse due to a single intake, so, according to the present invention, the dosage per day can be controlled and managed through a cloud server, leading to a safe and healthy CBD food culture. It also makes it possible to eat normally without being aware of other people looking at one and without hiding it, and to be freed from the psychological pressure that comes from controlling oneself.

In addition, the present invention can be only a method applicable to a platform in the field of collecting data to be applied to the causal symptoms and medical statistics in the processes of initial delivery of the CBD-containing foods or the like, taking the same, the stage requiring follow-up management, and a free diffusion stage. That is, it may provide a tool of collecting a large amount of data at the stages of initial entry according to initial management, data analysis and environmental changes around the world therefor, and full acceptance, and it is possible to reduce reluctance by taking CBD in the form of foods, instead of injections or patches, and to easily obtain and provide meaningful data to be applied to causal symptoms, medical statistics, and the like.

BRIEF DESCRIPTION OF DRAWINGS

The accompanying drawings, which are included as a part of the detailed description to help the understanding of the present invention, provide embodiments of the present invention and, together with the detailed description, explain the technical spirit of the present invention.

BEST MODE FOR CARRYING OUT THE INVENTION

Figure 1:
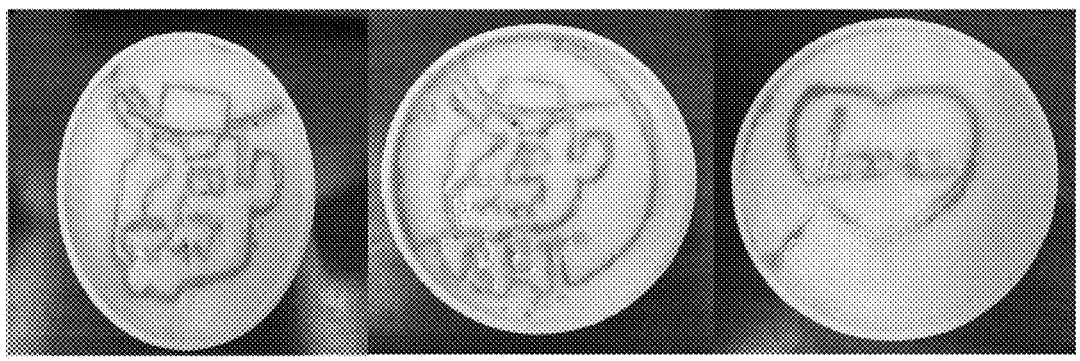
FIG. 1 is an example (e.g., coffee) of a 3D printing technique for foods.

Hereinafter, the present invention will be described in detail with reference to the accompanying drawings. Here, the same elements are denoted by the same reference numerals in the respective drawings when possible. In addition, detailed descriptions of previously known functions and/or configurations will be omitted. The content disclosed below will focus on parts necessary to understand operations according to various embodiments, and descriptions of elements, which may obscure the gist of the description will be omitted therefrom. In addition, some elements may be exaggerated, omitted, or schematically illustrated in the drawings. The size of each element does not fully reflect the actual size, so the content described herein are not limited to the relative sizes or spacing of the elements shown in each drawing.

In describing the embodiments of the present invention, if it is determined that a detailed description of the known technology related to the present invention may unnecessarily obscure the gist of the present invention, the detailed description will be omitted. In addition, the terms to be described later are terms defined in consideration of functions in the present invention, which may vary according to intentions or customs of users and operators. Therefore, definitions thereof should be made on the basis of the content throughout this specification. The terminologies used in the detailed description are intended only to describe embodiments of the present invention, and should not be limited. Unless explicitly used otherwise, singular expressions include the plural meanings. In this description, expressions "comprise" or "include" are intended to indicate certain features, numbers, steps, operations, elements, some thereof, or a combination thereof, and should not be construed to exclude the presence or possibility of one or more other features, numbers, steps, operations, elements, some thereof, or a combination thereof, which are not described. In addition, although terms such as first, second, and the like may be used to describe various elements, the elements are not limited to the terms, and the terms are used only for the purpose of distinguishing one element from another element.

First, an outline of a method for producing CBD (Cannabidiol)-containing foods or a CBD-containing product using a fluid, such as candles (scented candles), soap, cosmetics, oils, etc., using a 3D printing technique of the present invention will be described.

Figure 2:
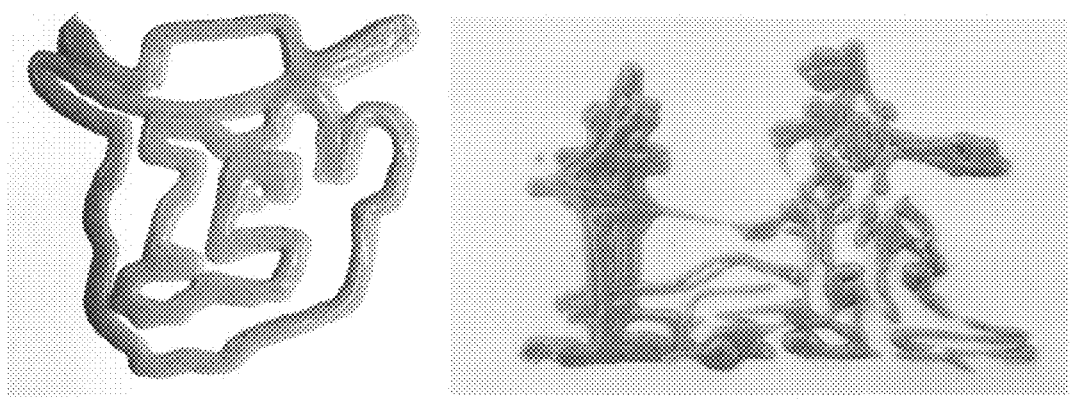
FIG. 2 is another example (e.g., sauce) of a 3D printing technique for foods.
Figure 2:
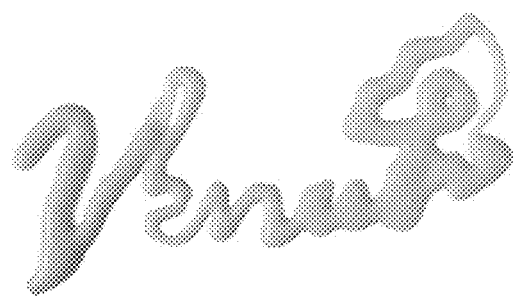
Figure 2:
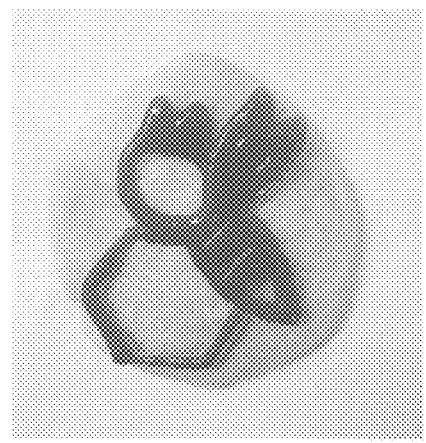

CBD (Cannabidiol) is represented by the chemical formula $C_{21}H_{30}O_2$ and has a molecular weight of 314.4617 g/mol. CBD may be extracted from the cannabis plant and contain THC (Delta-9-tetrahydrocannabinol) of less than 0.3% by weight. In 2016, Professor Namsu Kim, the inventor of the present invention, showed Carl's Jr at the headquarters in Memphis that food using 3D printing is possible. Since then, interest in CBD has skyrocketed, and Carl's Jr first unveiled CBD by providing 4/20 Weed Day burgers made of a CBD-containing sauce and a ham-based CBD oil for one day on Apr. 20, 2019. However, this requires much improvement in CBD content control, user confirmation thereon, and an individual intake method, and a 3D printing technique capable of solving this has not been applied thereto at all. As shown in FIGS. 1 and 2, a process of adding CBD to coffee or sauce using a 3D printing technique was carried out in New Mexico, and since New Mexico has rules that require the use of locally made CBD, it was confirmed that products are experimentally manufactured and successfully printed according to the rules.

Regarding the maximum amount of CBD contained in the individual foods, which is added according to the present invention, whether or not THC is contained, and the effect according thereto, the present invention provides food or the like in a unique shape using CBD-containing substances legally permitted for each country with an accurate quantitative control to satisfy consumer preferences, and the present invention excludes morbid applications beyond the effects and ingredients thereof, and the legal limit.

For example, in Korea, for CBD that is known to be effective in childhood epilepsy, parents of children with childhood epilepsy have recently illegally imported hemp, thereby causing many incidents and accidents. Cannabidiol oil, which has been available for prescription in Korea since Mar. 12, 2019, has given hope to people and their families who were expecting the development of a new anticonvulsant drug. In Korea, hemp was classified as an oil requiring careful calculation of usage. This is extremely limited only to the medicines, and the CBD oil and the hemp extract that families of patients suffering from epilepsy, rheumatism, insomnia, cancer, and Parkinson's disease attempted to purchase and use illegally cannot be imported and used as usual. For that reason, an official from the Korean Ministry of Food and Drug Safety said that the possibility of misuse cannot be ruled out and that only medicines made on scientific basis should be used. The present invention intends to propose a system and method for producing CBD-containing foods or CBD-containing products using a fluid such as candles (scented candles), soaps, cosmetics, and oils in countries where the law permits the use of CBD.

In the United States, depending on the state, CBD-related products are actively breaking out of the drug framework and receiving attention as pharmaceuticals and health functional foods, and it is expected to grow rapidly to a market of 20 trillion won in 2025.

Although U.S. Congress has legalized the farming and sale of cannabis nationwide, the Food and Drug Administration (FDA), as mentioned above, now makes it illegal under federal law to add CBD to food to be sold. However, the FDA has announced that in the near future the sale of foods infused with CBD in a diluted form will be allowed, and state and city councilors are making their own rules. Thus, the federal and state governments are expected to eventually allow CBD-infused foods, which will cause rapid changes in the world.

In the United States, as previously described, companies using CBD in foods and beverages have not been successfully adapted to the early stages of the CBD market due to unclear regulations in state and federal laws, which may be expected to be cause of a new conflict between countries and regions. For this reason, the growth rate of CBD is slow in the United States, Japan, China, and Korea compared to applications developed mainly in Canada, Australia, New Zealand, and Europe. However, it is expected that the applications of marijuana, which has lower addictiveness and dependence on violence than alcohol and tobacco, and, furthermore, CBD free of hallucinogenic THC will be ultimately legalized and that they will be applied to the field for relieving obsession and stress of the general public as well as the medical field such as a new tranquilizer, a muscle relaxant, insomnia, and a painkiller. Hopefully, the present invention can be only a method applicable to a platform in the field of collecting data to be applied to the causal symptoms and medical statistics in the processes of initial delivery of the CBD-containing foods or the like, taking the same, the stage requiring follow-up management, and a free diffusion stage.

As CBD extracts become more popular around the world, more than 20,000 clinical trials and studies have been conducted mainly in Canada and Australia, and the studies showed that the CBD extract was helpful for treatment anxiety, post-traumatic stress disorder, and diseases including chronic pain such as Parkinson's disease. In line with the studies, at present, new attempts are made for direct ingestion of CBD, patches, intravenous injections, injection of CBD into the skin, cornea, lips, or the like, and taking CBD with food. After all, even if these legislative measures are taken, in order to overcome the stigma and misconception as a drug, the present invention can make a significant contribution as a tool for collecting a large amount of data at the initial entry according to initial management, data analysis and environmental changes around the world therefor, and the stage of full acceptance, and as a method for obtaining meaningful data while reducing reluctance by taking the same in the form of food or the like, compared to injection or patches.

As described above, in the present invention, a system is installed to allow only a person who is authorized to manage personal information through interaction between Wi-Fi installed in a 3D printer and a cloud so that a person which is not authorized to use the patent pending equipment of Biomedical 3D Printing Co. Ltd. cannot access the information and it is stored in an encrypted cloud server. If everything is fully legalized for CBD, this process may be omitted, as necessary. In the future, although it is expected to introduce a telemedicine system that administers customized ingredients in consideration of the limit of one-time administration of CBD by taking food at the time desired by the consumer while verifying the right amount and effectiveness of the components, the present invention proposes a method for popularizing CBD as part of the regular diet rather than as a medicine.

For example, as a method for treating insomnia by analyzing food materials, it is possible to customize and optimize a method of producing health functional food by quantitative control according to the intake amount of CBD through a combination of a step of measuring the amount of CBD for individual intake when preparing ingredients for making the food and applying the same to the top of the cup containing decaffeinated coffee including CBD in order to take the right amount thereof on the way home, a step of preparing the applied ingredients for printing by a 3D printer (e.g., a printer to which the patented 3D printer operating system technology of Biomedical 3D Printing Co. Ltd. is applied), a step of performing communication between experts (doctors/pharmacists, etc.) and users (patients/families, etc.) about the amount of CBD contained in the ingredients and expected effects thereof, and a step of obtaining results such as the status of the user and the like from the experts in real time through sound or subtitles. Accordingly, it can be applied as a method of monitoring how the final sleep process is improved.

In addition, the cooking method of the CBD-containing food may change depending on the progress of the order, and may be served in the same manner as food that does not contain CBD after the order is processed or depending on prescription in order to make sure no one knows if CBD has been added to anyone other than someone who needs to consume a drink or food containing CBD. This feature may be used for comparative analysis of drug effect data by placebo effect through comparative experiments without actually adding CBD by agreement of the user and the supplier.

In the present invention, the printer is controlled on the cloud, that is, on the network. All data may be organized on the cloud, and design, image, or printing data we need to print may be collected and stored in the cloud. In addition, in the case of using the cloud, it is possible to control the conditions of the printer such that the user can start and finish printing at any time the user wants and anywhere, thereby enabling remote control of printing even if the conditions depending on the ingredients are not nearby. In other words, data on the food printing status and the printer status may be analyzed on the cloud on the basis of a camera, a nozzle, a temperature sensor, the number of equipment operations, and the like, thereby producing higher quality results on the basis of the conditions of optimally printed examples. In addition, it is possible to manage a designed printing file to be distributed to designated printers on the cloud through a personal mobile phone app, a website, or the like and to be printed.

In order to deal with a printer failure, the operating apparatus or the operating system may identify a problem on the basis of the operating status of printer equipment or the number of operations thereof, or printing cases and camera recordings collected in the cloud, and may indicate a solution thereof or the like. Therefore, if the food 3D printer having the aforementioned supplementation is actually used, it is possible to enable activation of the food 3D printing industry in which the user can eat a 3D structure made of more diverse ingredients precisely and safely anytime and anywhere.

Hereinafter, although a 3D printing operating system 500 according to an embodiment of the present invention will be described on the basis of an example in which a (3D) printer 100 of the present invention prints objects such as food, candles (scented candles), soaps, cosmetics, oils, and the like, the present invention is not limited thereto, and it should be noted that the technology of the present invention can be applied to printing various types of 3D, 2.5D, 2D objects, etc. in overall fields such as industry, as well as objects such as food, candles (scented candles), soaps, cosmetics, oils, and the like.

Figure 3:
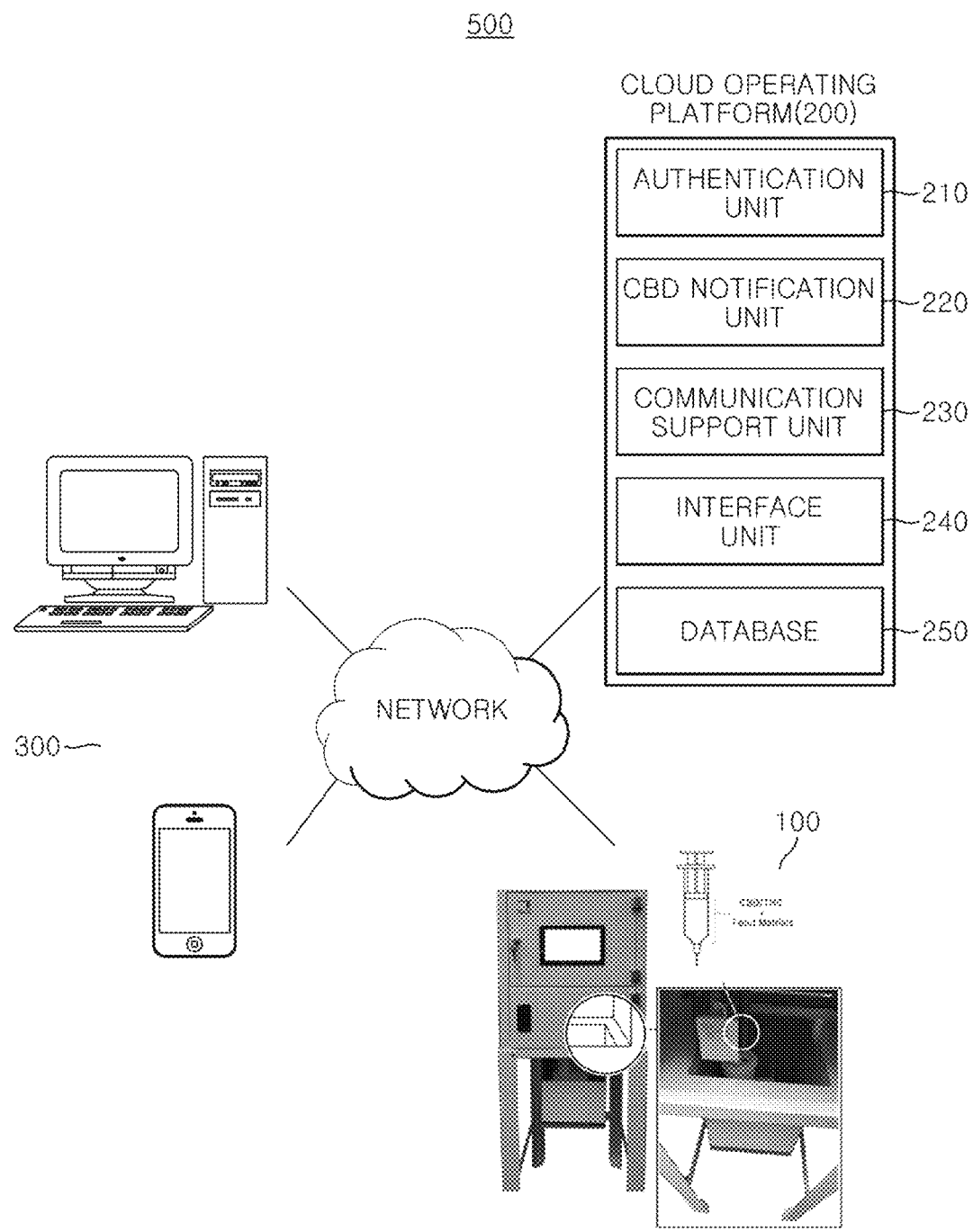
FIG. 3 is a diagram illustrating a 3D printing operating system according to an embodiment of the present invention.

FIG. 3 is a diagram illustrating a 3D printing operating system 500 according to an embodiment of the present invention.

Referring to FIG. 3, a 3D printing operating system 500 according to an embodiment of the present invention includes one or more 3D printers 100, a server-type cloud operation platform 200, and a plurality of terminals 300, which are capable of interworking on a network. The terminal 300 include a terminal of a user who intends to ingest CBD or a terminal of a specialist such as a doctor/pharmacist.

In the present invention, the 3D printer 100 prints and produces 2D (dimension), 2.5D, or 3D foods, or objects such as candles (scented candles), soaps, cosmetics, oils, and the like using a fluid containing CBD. The fluid for producing an object may contain CBD in a range of 0.001 wt % to 95.0 wt %, and in this case, THC of 0.0 wt % to 10.0 wt % may be included in the fluid. As described below, 3D printing may indicate the case of moving in the x, y, and z axes, which are orthogonal coordinate axes, 2D printing may indicate the case of moving the x and y axes, and 2.5D printing may indicate the case of applying a CBD-containing fluid such as syrup, sauce, or the like onto the top of the objects such as hamburgers, steaks, tacos, pizzas, cakes, ice creams, coffee, juice, yogurt, chocolate, cookies, candies, pretzels, pastas, and the like, which are partially pre-completed, thereby further realizing objects in the form of a subject, pattern, letter, sentence, logo, or caricature.

Here, the network for interworking of the 3D printer 100, the cloud operation platform 200, and the plurality of terminals 300 may be a network supporting wired communication or wireless communication, including wired Internet communication, wireless Internet communication such as Wi-Fi, WiBro, and the like, and mobile communication such as WCDMA, LTE, and the like.

The terminal 300 may include a wireless terminal such as a smartphone, a wearable device capable of voice/video calls, a tablet PC, a notebook PC, and the like, and, in some cases, may further include a wired terminal such as a desktop PC, other communication-only terminals, or the like. The terminal 300 may be equipped with an application capable of Internet of Things (IoT) in order to receive services related to the operation of the 3D printer of the present invention.

The cloud operation platform 200 may manage subscription information for users who are provided with services related to the operation of the 3D printer of the present invention through the terminal 300 and relay transmission and reception of various controls or necessary information between the terminal 300 and the 3D printer 100. According to the relay of the cloud operation platform 200, the users or their families, or specialists such as doctors, pharmacists, and like may remotely manipulate the movement (x, y, or z-axis movement, etc.) of the 3D printer 100 or a bed 10 using the terminal 300 equipped with an IoT function-equipped application and transmit job data of the desired design, thereby controlling printing for the 3D object. The 3D printer 100 may control movement of a discharge unit (see 85 and 95 in FIG. 4) in the x-axis or y-axis direction, movement of the bed 10 in the z-axis direction, a change in a discharge material (a fluid containing CBD), or stop of operation according to control commands received from the terminal 300, and perform control such that an image for producing a corresponding object is transmitted in real time to the terminal 300 and such that the cloud operation platform 200 provides analysis information on the process of producing foods or objects such as candles (scented candles), soaps, cosmetics, oils, and the like to the terminal 300 real-time.

In addition, the cloud operation platform 200 may manage information on 3D objects printed and produced by a plurality of 3D printers 100 on the network, for example, the number of printing operations for each printer, job data and printing examples (e.g., design, material, etc.), images for the process of producing objects, frequently asked questions and answers, information on consumer preferences, or the like, in the database 250, and may provide the information in the database 250 to the terminal 300 so as to order an object to be printed with reference thereto. For example, data such as design and material of a 3D object to be printed and produced on the basis of accumulated information of information on 3D objects in the plurality of 3D printers 100 may be analyzed to recognize consumer preferences, and the schematized information may be provided to the terminal 300. In addition, on the basis of the accumulated information, the cloud operation platform 200 may analyze big data on future strategic service sales, company management, safety status of equipment such as the 3D printer 100, housing device 150, etc., and the like and provide meaningful analysis results applicable to advertising contracts with advertising companies on site or the like.

Although objects such as foods, candles (scented candles), soaps, cosmetics, and oils may be printed by directly inputting job data to the 3D printer 100, it is also possible to print a corresponding object in the form of a subject, pattern, letter, sentence, logo, or caricature by controlling movement of the discharge unit of the 3D printer 100 according to digital data on pictures, design, photos, text, or information input by writing or drawing by hand, as 3D job data transmitted from the terminal 300. At this time, a control device 120 of the 3D printer 100 may provide the terminal 300 in real time with an image for the process of producing a corresponding object obtained through a camera installed inside the housing 150 (e.g., around the nozzle of the discharge unit, etc.) during the printing and producing of the object.

As described above, in the present invention, since IoT is supported by operating the cloud operation platform 200 on the network, it is possible to analyze equipment such as the 3D printer and the like, and the situation of consumers and respond thereto directly on the spot, as well as performing remote control and printing, using a mobile function even if the user is far away from the terminal 300. In addition, it is possible to provide a system in which a product may be pre-ordered by an image, etc. through the terminal 300 on the network such as the Internet or the like or in which the ordered product may be printed by a printer and stored automatically, and may be picked up directly without the help of a clerk after automatic payment using a password, etc. on a keypad or terminal. In addition, in the present invention, using the 3D printer 100 operated in the operating system 500 as described above, foods or objects such as candles (scented candles), soaps, cosmetics, oils, etc. may be printed by an xy driving unit 111 or fluid discharge units 85 and 95 of a piston discharge driving unit 112 that is attachable to and detachable from the xy driving unit 111, thereby improving the precision of obtaining an object, keeping the object warm and cold, and easily separating the object from the 3D printer 100. For example, a nozzle may be connected to the end of the fluid discharge unit 85 or 95 through a reducer, and the control device 120 of the 3D printer 100 may control discharge of a fluid by a piston of the piston pump driving unit 112, thereby controlling the production of objects with repeatable uniformity to have a precision of ±0.5% compared to the target weight.

In particular, as shown in FIG. 3, the cloud operation platform 200 of the present invention may include an authentication unit 210, a CBD notification unit 220, a communication support unit 230, an interface unit 240, and a database 250.

Figure 4:
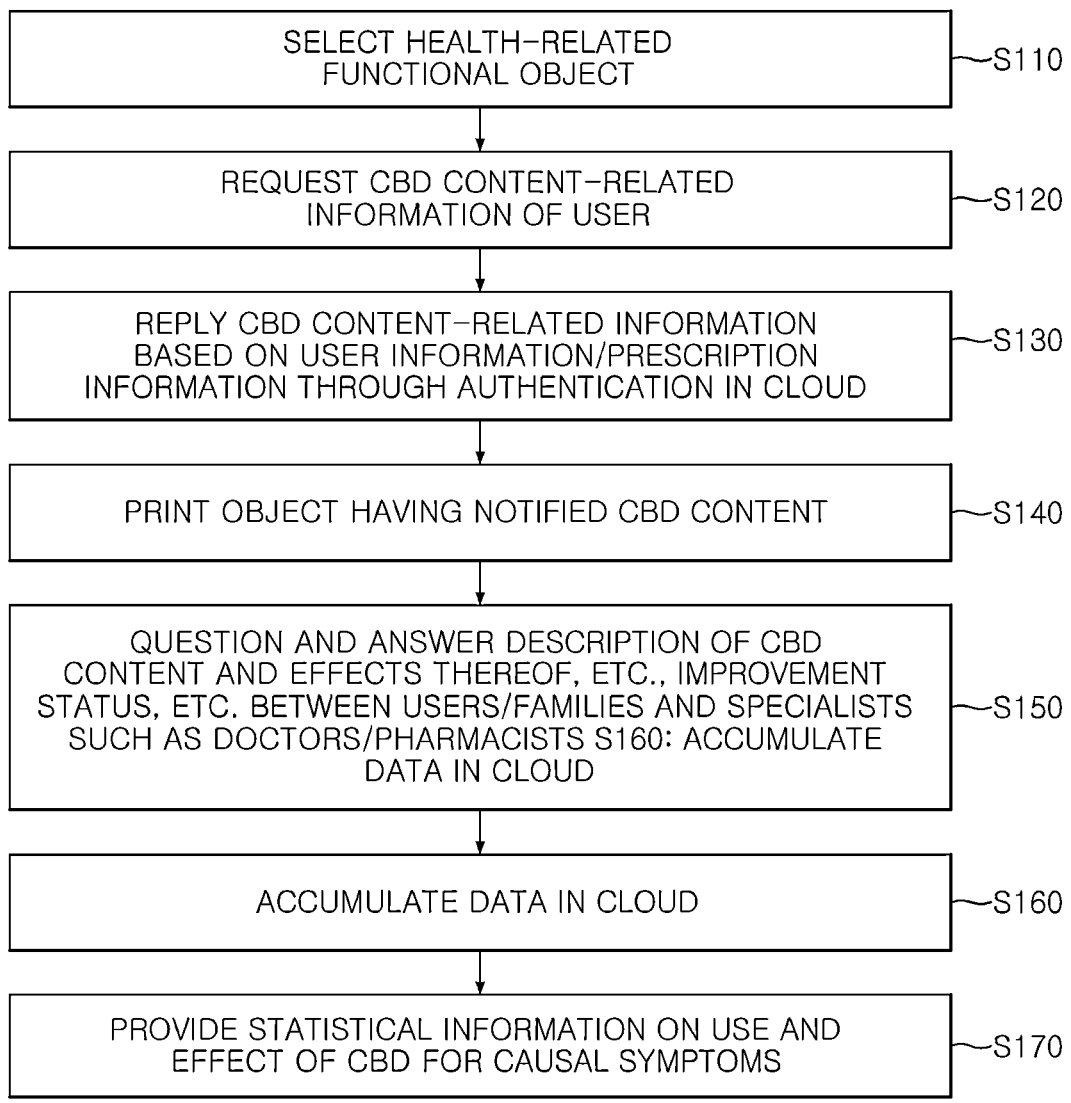
FIG. 4 is a flowchart illustrating the operation of a 3D printing operating system according to an embodiment of the present invention.

Hereinafter, the operation of the 3D printing operating system 500 including the cloud operation platform 200 according to an embodiment of the present invention will be described with reference to the flowchart of FIG. 4.

First, the user terminal 300 may be equipped with an application capable of the Internet of Things (IoT) in order to receive services related to the operation of the 3D printer of the present invention. The user may execute an application in the user terminal 300 and select, as health-related functional objects, for example, objects for helping or treating nerve stability, muscle relaxation, pain relief, epilepsy, rheumatism, cancer, Parkinson's diseases, etc., foods including a CBD-containing fluid, such as hamburgers, steaks, tacos, pizzas, cakes, ice creams, coffee, juice, yogurt, chocolate, cookies, candies, pretzels, pastas, syrup, sauce, etc., or objects such as candles (e.g., scented candles produced using essential oil containing CBD), soaps, cosmetics, oils, etc. through an application screen (e.g., menus, icons, etc.) (S110).

The user may select such a health-related functional object through the application screen of the user terminal 300, and then input a request for CBD content-related information through a menu, an icon, etc. to transmit the same to the cloud operation platform 200 (S120).

In the cloud operation platform 200, in response to a request (e.g., including user identification information such as an ID, a password, contact information, etc.) from the user terminal 300, the authentication unit 210 may perform user authentication to determine whether or not to allow service for corresponding user information (e.g., an ID, a password, contact information, causal symptoms, etc.) or specialist prescription information (e.g., an image or text information of prescription of specialists such as doctors/pharmacists, etc.) with reference to the database 250. For example, the authentication unit 210, for the user authentication, may identify whether or not the user identification information (e.g., an ID, a password, contact information, etc.) included in the request from the user terminal 300 and the user information (e.g., an ID, a password, contact information, causal symptoms, etc.) or the specialist prescription information (e.g., an image or text information of prescription of specialists such as doctors/pharmacists, etc.) in the database 250 match each other, thereby performing authentication, and, if authentication is successful, allow use of the service to produce foods or 3D objects such as candles (scented candles), soaps, cosmetics, and oils by the CBD-containing fluid. In some cases, for the user authentication, the authentication unit 210 may perform additional authentication through communication with a management agency server. For example, the management agency may be an external agency such as the government, a government-affiliated agency, or a private agency authorized by the government for controlling the amount of use of CBD, and may operate a server for authentication, and the authentication unit 210 may pass authentication in the management agency server using a predetermined certificate such as an accredited certificate, etc.

After the above user authentication is made, in the cloud operation platform 200, the CBD notification unit 220 may transmit, to the user terminal 300, CBD content-related information produced on the basis of the user information (e.g., an ID, a password, contact information, causal symptoms, etc.) or the specialist prescription information (e.g., an image or text information of prescription of specialists such as doctors/pharmacists, etc.) and control the user terminal 300 to transmit job data including the CBD content-related information to the remote 3D printer 100 through the network (S130). Accordingly, the 3D printer 100 produces an object having a corresponding CBD content using a CBD-containing fluid (S140). Here, the CBD content-related information may be information including a weight ratio (wt %) of CBD in the fluid for producing the object, or the volume of a fluid when the CBD content of the fluid is already known.

While the 3D printer 100 produces hamburgers, steaks, tacos, pizzas, cakes, ice cream, coffee, juice, yogurt, chocolate, cookies, candies, pretzels, pastas, etc., or produces foods by decorating syrup, sauce, etc. thereon, or produces objects such as candles (scented candles), soaps, cosmetics, oils, etc. using a CBD-containing fluid according to the job data including the CBD content-related information, the communication support unit 230 may provide data based on camera image information from the 3D printer 100 to the specialist terminal and the user terminal so as to display the process of producing the object on the screen, and support the exchange of two-way remote communication information including voice or text between the specialist terminal 300 and the user terminal 300 (S150). The communication support unit 230 may extract a description (e.g. descriptions of promotional materials, prescriptions, precautions, etc.) of the use and effects of CBD-containing objects corresponding to the user's causal symptoms (e.g., nervous stability, muscle relaxation, insomnia, analgesia, epilepsy, rheumatism, cancer, Parkinson's diseases, etc.) with reference to the database 250 and provide the same, as the two-way remote communication information, to the user terminal 300, and may support monitoring by exchanging question-and-answer information about the user's symptom improvement status in both directions between the specialist terminal and the user terminal.

The interface unit 240 manages the history of the use and effects of the CBD-containing object produced by the 3D printer 100 corresponding to the causal symptom for each user in the database 250 to accumulate data (S160).

The interface unit 240 may provide statistical information by analyzing the use and effects of a CBD-containing object for a specific user or users for each causal symptom according to a request for statistic through the specialist terminal and the user terminal (S170). For example, statistical information, such as effects (e.g., high, medium, low, etc.) depending on the number of intakes (e.g., 5 days, 10 days, 1 month, etc. when taking 3 times a day) according to the CBD content contained in each food or object such as candles (scented candles), soaps, cosmetics, oils, etc. may be provided. The statistical information may be provided to be graphically displayed as a bar graph or the like.

Hereinafter, the 3D printer 100 according to an embodiment of the present invention will be described in more detail with reference to FIG. 5.

Figure 5:
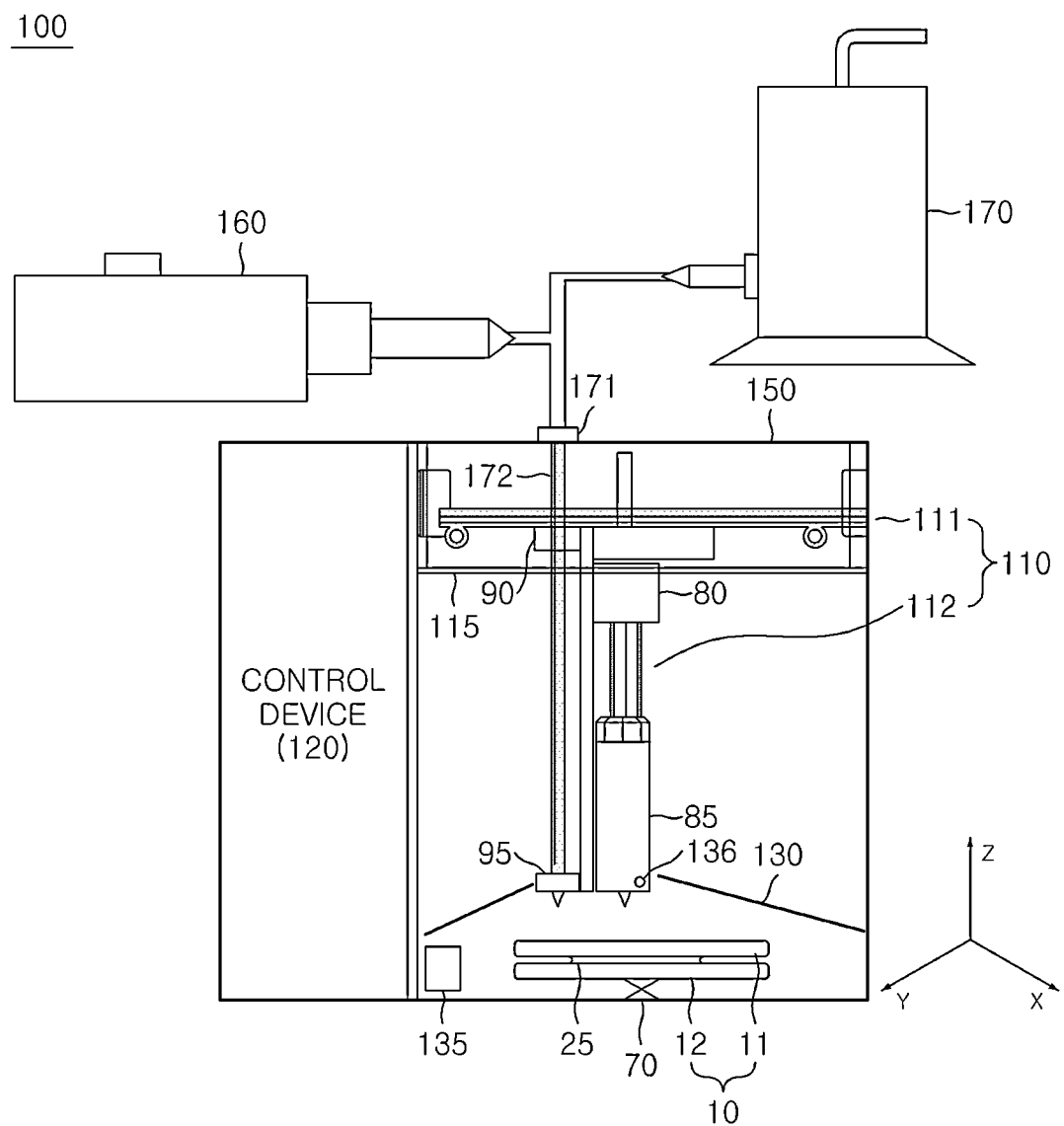
FIG. 5 is a diagram illustrating an example of a 3D printer according to an embodiment of the present invention.

FIG. 5 is a diagram illustrating an example of a 3D printer 100 according to an embodiment of the present invention.

Referring to FIG. 5, the 3D printer 100 according to an embodiment of the present invention includes a control device 120, one or more fluid feeders 160 and 170, a printer device 110, a sanitary membrane 130, a keep-warm/keep-cold mechanism 135, and a camera 136. The printer device 110 installed on the upper side of a housing 150 by a support 115 includes an xy driving unit 111 including a discharge unit 95 capable of being attached and detached through a coupling member 90, and a piston pump driving unit 112 including a discharge part 85 capable of being attached and detached through a coupling member 80. In addition, the 3D printer 100 includes a bed 10 that can be attached and detached, together with a z-axis driving unit 70, to and from the bottom of the housing 150 for forming objects such as foods or objects such as candles (scented candles), soaps, cosmetics, and oils thereon, and the bed 10 corresponds to a z-axis driving unit operated in the z-axis direction by the z-axis driving unit 70 such as an actuator. Since the xy driving unit 111 and the piston pump driving unit 112 are attachable and detachable, one or more xy driving units or piston pump driving units may be selectively mounted and used depending on the type or property of a material for forming the object to be printed.

Although not shown in the drawings, an openable door may be provided on one wall of the housing 150, and the door may be closed during printing, and may be opened to take out an object upon completion of printing. Such a door may be automatically controlled by the control device 120.

The fluid feeder 160 or 170 is a device for pressurizing a CBD-containing fluid material, such as an extruder, a piston printer, a churros extruder, a mono pump, etc., and the fluid feeders 160 and 170 may discharge a fluid through an end nozzle in PTE (Piston Type Extrusion) or STE (Screw Type Extrusion). The fluid feeders 160 and 170 may be properly installed on the upper side of the inside of the housing 150, or may be properly installed on the ceiling of a building as shown in the drawing.

The nozzle ends of the fluid feeders 160 and 170, through which the pressurized fluid is discharged, may be connected to respective pipes (hoses, tubes, etc.) 172 connected to respective discharge units 95 through respective coupling members 171 independently of each other. As shown in the drawing, the nozzle ends of the fluid feeders 160 and 170 may be combined in one pipe and connected to the pipe (hose, tube, etc.) 172 connected to one discharge unit 95 through one coupling member 171. The pipe 172 between the coupling member 171 and the coupling member 90 may be made of a flexible pipe so as to move freely as the discharge unit 95 or the discharge unit 85 of the piston pump driving unit 112 moves in the x and y-axis directions according to the movement control of the xy driving unit 111 in the x and y-axis directions.

The discharge unit 95 or the discharge unit 85 of the piston pump driving unit 112 may move in the x and y-axis directions (front, back, left, and right directions) according to the x and y-axis movement control of the control device 120, and the bed 10 may move in the z-axis direction by the z-axis driving unit 70 according to the z-axis movement control of the control device 120.

According to the control of x/y-axis movement of the 3D printer 100 and the control of z-axis movement of the bed 10, during the printing operation, the fluid pressurized by the pressure of the fluid feeders 160 and 170 may be supplied and discharged onto the bed 10 through the end nozzle of the discharge unit 95, and the discharge unit 85 of the piston pump driving unit 112 may discharge the fluid onto the bed 10 through the nozzle by the movement of the piston that applies pressure to the fluid contained in a cylinder container in a PTE (Piston Type Extrusion) method, or the discharge unit 85 may discharge the fluid onto the bed 10 through the nozzle by rotation of a screw for discharging the fluid contained in a container in an STE (Screw Type Extrusion) method.

In addition, the nozzle may be connected to the end of each discharge unit 85 or 95 through a reducer, and the tip of the nozzle may be coupled in various tip shapes such as angled tips, non-angled tips, or the like. Accordingly, the control device 120 may control discharge of the fluid by the piston of the piston pump driving unit 112, thereby controlling the production of an object with repeated uniformity to have a precision of ±0.5% compared to a target weight.

If an object, which is partially pre-completed, is placed on the bed 10 or if other substrates such as paper or a partially pre-completed object is placed at a corresponding position without the bed 10, printing may be performed by discharging the fluid composed of liquid or other fluids (including food materials and all fluid materials other than food materials) on the corresponding structure (a substructure that contains or does not contain CBD). During the printing, the bed 10 may move from a higher position to a lower position or move up and down by the z-axis driving unit 70 to adjust the height thereof, thereby obtaining a 3D object in multiple layers. In addition, when the bed 10 is detached or when the bed 10 does not move along the z-axis, it is possible to print a 2D or 2.5D object that is formed by discharging one layer onto the bed 10, instead of the multiple layers of the object, or a partially pre-completed object thereon (or onto a predetermined substrate such as paper, etc.).

The control device 120 may serve to perform overall control of the 3D printer 100 such as the fluid feeders 160 and 170, the printer device 110, and the like, and generate a control signal that causes the printer device 110 to produce an object on the bed 10 on which a keep-warm/keep-cold mechanism 25 is installed according to job data including CBD content-related information. According to the control signal of the control device 120 as described above, the fluid may be discharged through the nozzles of one or more of the discharge unit 95 coupled to the xy driving unit 111 or the discharge unit 85 coupled to the piston pump driving unit 112 mounted to the xy driving unit 111.

The bed 10 may be configured as two substrates 11 and 12 and a keep-warm/keep-cold mechanism 25 interposed therebetween. The mechanism 25 may keep a printed object cold using liquid nitrogen, dry ice, a Peltier cold plate, or the like, and may be applied to the case where the shape of the object is required to be maintained without being distorted. Alternatively, the mechanism 25 may be made of a heating plate capable of heating up to a predetermined temperature (e.g., 100 degrees C.), and may be applied to keeping the printed object warm so as not to be cooled down.

In addition thereto, as described below, a keep-warm/keep-cold mechanism 135 may also be included in the lower side of the sanitary membrane 130. In addition, a keep-warm/keep-cold mechanism 135 may be disposed around the discharge units 85 and 95. The keep-warm/keep-cold mechanism 135 may be an oven, a freezer, or the like.

The above keep-warm/keep-cold mechanisms 25 and 135 may perform temperature control under the control of the control device 120, and in particular, the viscosity of the discharged fluid may be adjusted through temperature control of the discharge units 85 and 95 according thereto, so that a fluid having a wide range of viscosity from high viscosity to low viscosity may be discharged through the discharge units 85 and 95 to then be printed.

The sanitary membrane 130 may be made of a flexible material, and may extend from the side surfaces of the discharge unit 95 coupled to the xy driving unit 111 and the discharge unit 85 coupled to the piston pump driving unit 112 to the wall of the housing 150 at a predetermined slope (e.g., a downward slope to the housing) so as to divide the overall space of the housing into upper and lower spaces. The sanitary membrane 130 may be in the form of a bellows, a paper filter, etc., capable of being gently folded or unfolded according to the movement of the discharge units 85 and 95 in the x or y-axis direction or having elasticity, or may be made of a material such as rubber or the like, and other types of mode separation walls or separation membranes are possible.

The sanitary membrane 130 may prevent harmful substances, dust, or impurities generated from the upper portion in which a mechanical operation is performed from falling onto an object, and prevent food dust or food waste flying and sticking to a machine part from falling onto an object later, thereby providing a clean object without sanitation problems. Since the sanitary membrane 130 has a downward inclination from the discharge units 85 and 95 to the side wall of the housing 150, harmful substances, dust, impurities, or food waste falling from above may be naturally collected at the edge of the sanitary membrane 130, thereby facilitating separation and discarding thereof.

The 3D printer 100 according to an embodiment of the present invention may further include a camera 136 for obtaining an image for the process of producing an object using the printer device 110. The camera 136 may be installed under the sanitary membrane 130, for example, around the nozzles of the discharge units 85 and 95 or the like, and the control device 120 of the 3D printer 100 may transmit image (e.g., moving images, still images, etc.) information about the production process of the object obtained through the camera 136 installed as described above to the terminals 300 or the cloud operation platform 200 in real time during the printing and production of the object.

As described above, in the present invention, the control device 120 may interwork with the terminal 300 according to the relay of the CBD notification unit 220 of the cloud operation platform 200 on the network to execute job data (e.g., drawings, designs, photographs, text, or information entered by handwriting or drawing) ordered through the terminal 300. The terminal 300 may process drawings, designs, photographs, text, information entered by handwriting or drawing, etc. entered by the user using an equipped application, and transmit digital data thereof to the control device 120. The control device 120 performs x/y-axis movement control of the 3D printer 100 and z-axis movement control of the bed 10 in order to produce an object for the received job data. During the printing operation according to the x, y, z-axis movement control, a pressurized fluid may be supplied by the pressure of the fluid feeders 160 and 170, and the fluid may be discharged onto the bed 10 through the end nozzle of the discharge unit 95, and the discharge unit 85 coupled to the piston pump driving unit 112 may discharge the fluid onto the bed 10 through the nozzle by the movement of the piston that applies pressure to the fluid contained in the cylinder container. In the case where a partially pre-completed object is placed thereon, the above fluid made of a liquid or fluid material may be discharged onto the substructure, such as the corresponding food to then be printed. The process of producing the object may include a finishing process of coating with a fluid such as sugar water.

In addition, the piston pump driving unit 112 may include an electric heating device for heating the solid state material contained in the cylinder container according to the control of the control device 120. In this case, the material, which is in the solid state at room temperature, such as chocolate, sugar, or cheese, may be melted using the electric heating device, and thus, the discharge unit 85 of the piston pump driving unit 112 may discharge the melted material onto the bed 10 through the nozzle under the sanitary membrane 130 as described above. At this time, the discharged material may be cooled and solidified using the keep-cold mechanism 25 of the bed 10 under the sanitary membrane 130 or using the keep-cold mechanism 135 installed under the sanitary membrane 130, thereby form a corresponding object.

The control device 120 may be implemented as hardware such as a semiconductor processor, software such as an application program, or a combination thereof in order to provide such an overall printing service.

As described above, the control device 120 executing the ordered job data may provide an image for the production process of the object obtained from the camera 136 to the specialist/user terminal 300 in real time. In addition, during such a printing operation, the control device 120 may control to provide analysis information on the production process of the corresponding object from the interface unit 240 of the platform 200 to the terminal 300 in real time.

The control device 120 may transmit, to the cloud operation platform 200, information including one or more of an image for the production process of an object, information (e.g., an operating state, a speed, etc.) on the actuator (or motor) for driving the x, y, and z-axis movement, information (e.g., an operating state, temperature, etc.) on one or more temperature sensors installed inside the housing 150, the number of printing operations, or information on the production environment (e.g., a fluid discharge path, a fluid discharge speed, a discharge thickness, etc.) of an object, and the interface unit 240 of the cloud operation platform 200, with reference thereto, may provide, to the terminal 300, analysis information including x/y-axis movement speeds of the discharge units 85 and 95 or a z-axis movement speed of the bed 10, discharge pressure of the discharge units 85 and 95, the thickness of an object, or temperature, thereby controlling the terminal 300 to generate a control command with reference thereto.

Accordingly, the user may check the image for the production process of the object, the analysis information, etc. to identify the printing progress, and, if it is necessary to correct the production process, change the fluid, or stop the operation, may transmit a necessary control command through the terminal 300. The control device 120 may control the x-axis or y-axis movement of the discharge units 85 and 95 or the z-axis movement of the bed 10, a change in the discharge material, stop of operation, etc. according to the control command received from the terminal 300. For example, the discharge material may be changed by selectively operating the discharge units 85 and 95 or by selecting one to be operated from among the plurality of fluid feeders 160 and 170.

As described above, the cloud operation platform 200 may manage information on 3D objects printed and produced by a plurality of 3D printers 100 on the network, for example, the number of printing operations for each printer, job data and printing examples (e.g., design, material, etc.), images for the process of producing objects, frequently asked questions and answers, information on consumer preferences, or the like, in the database 250, and may provide the information in the database 250 to the terminal 300 so as to order an object to be printed with reference thereto. The consumer preferences or tastes may be related to any one or more printers for printing a predetermined object, among a plurality of printers on the network, and thus, the cloud operation platform 200 may provide information on the preferred printers to the terminal 300 so that printing may be made in a printer designated by the user when ordering an object to be printed. For example, data such as design and material of a 3D object to be printed and produced on the basis of accumulated information of information on 3D objects in the plurality of 3D printers 100 may be analyzed to recognize consumer preferences, and the schematized information may be provided to the terminal 300. In addition, on the basis of the accumulated information, the cloud operation platform 200 may analyze big data on future strategic service sales, company management, safety status of equipment such as the 3D printer 100, housing device 150, etc., and the like and provide meaningful analysis results applicable to advertising contracts with advertising companies on site or the like.

Meanwhile, the control device 120 may control the movement of the discharge units 85 and 95 according to the digital data on drawings, designs, photographs, text, or information entered by handwriting or drawing, as the above job data, realize an object for the shape of the corresponding subject, pattern, letter, sentence, logo, or caricature on the bed 10 or on the paper on the bed 10, and, in particular, according to an SLD (single-line design) method, perform the production of an object configured as a seamless and continuous line of fluid by continuously printing the fluid through the discharge units 85 and 95. The fluid discharged through the discharge unit 85 and 95 may be a material having a variety of fluidity such as liquid or other fluid materials for making burgers, steaks, tacos, pizzas, cakes, ice cream, coffee, juice, yogurt, chocolate, cookies, candies, pretzels, pastas, etc., a food fluid such as syrup, sauce, etc. for decoration on the substructure produced thereby, a fluid for manufacturing industrial or household objects such as candles (scented candles), soaps, cosmetics, oils, etc., or the like. It is desirable not to apply additional vacuum packaging or other treatments to preserve the freshness of the material and save printing time.

The above SLD (single-line design) printing method can reduce the printing time and reduce the time during which the material reacts with air. Using this platform relay contactless printing technology, printing is possible while controlling the viscosity at 12,000 Pa·s, and, especially while adjusting the freshness of CBD-containing food. If SLD is applied to the PTE method of efficient fluid feeders 160 and 170/discharge unit 85 for precisely controlling a small amount of food materials, it may be effective to quickly print CBD, which is sensitive to temperature and chemical reaction. When using the SLD technology for high-viscosity food materials, the nozzle (head) of the discharge unit 85 or 95 is one of the most important factors in controlling the final amount of CBD by making a continuous line that does not break during printing for reasons such as overlapping space. SLD is applied to improve the accuracy of CBD content and printing efficiency in high-viscosity materials and to preserve artistic value. When using fluid foods, it is possible to control the right amount of CBD content by forming a superior material that can realize food itself through a seamless single line. The pressure applied to the material and movement speed of the PTE/STE-type discharge units 85 and 95 may be adjusted to print the shape of SLD design in a short time under the optimal discharge conditions.

For example, the fluid discharged through the discharge units 85 and 95 may be discharged preferably in a force range of 5 to 50N for a high-viscosity food material, and the discharge flow thereof may be controlled according to HP (Hagen-Poiseuille) equation, as shown in Equation 1, thereby providing an object produced by 3D printing of thixotropic foods. Here, $q_w$ is a mass flow rate (g/s), r is the inner radius (m) of the nozzle, $\Delta P$ is a pressure drop (Pa), $\rho$ is a food material density (g/cm$^3$), and $\mu$ is a dynamic fluid viscosity (Pa·s), and L is a nozzle length (m).

$$q_w = \frac{\pi r^4 \Delta P \rho}{8 \mu L} \qquad [\text{Equation 1}]$$

Figure 6:
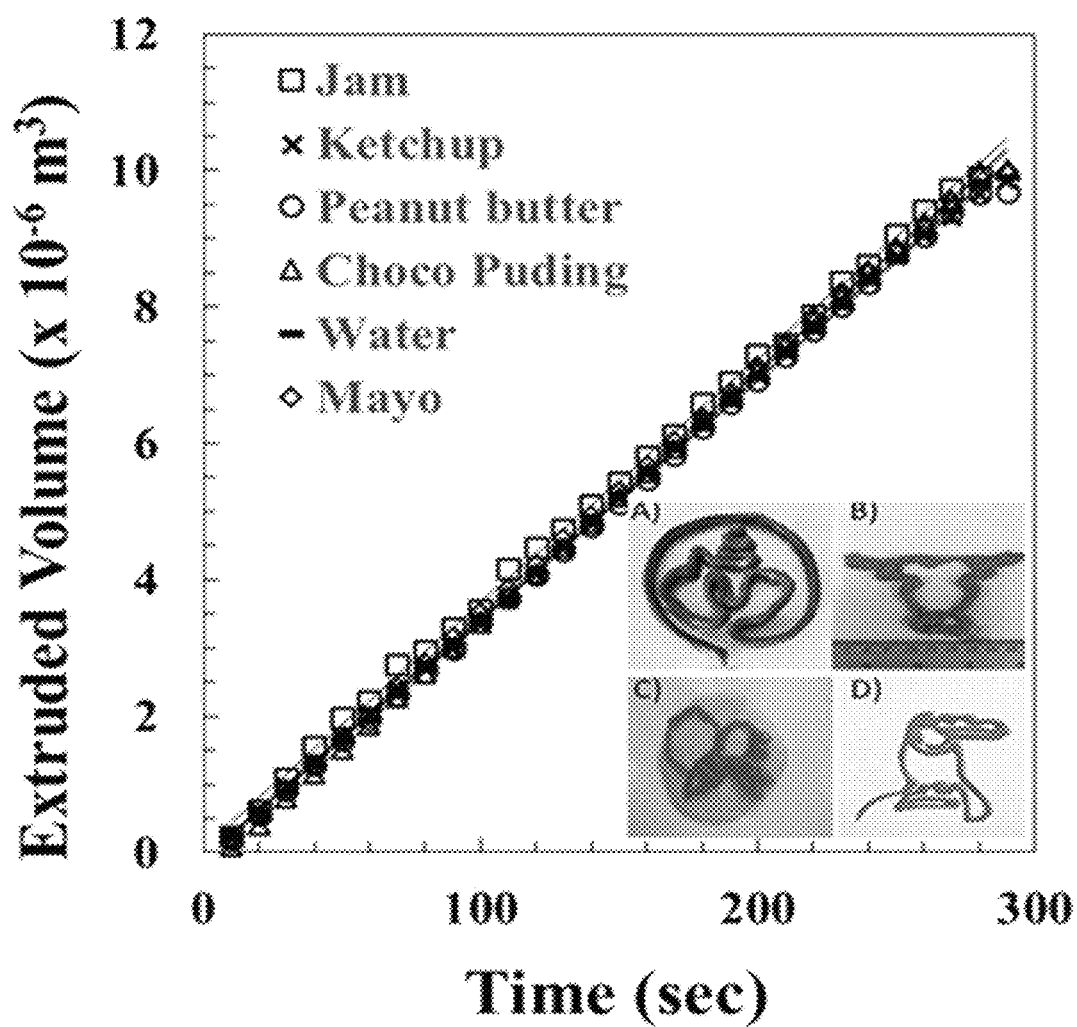
FIG. 6 is an example of the amount of discharged fluid over time in an SLD (single-line design) printing method of the present invention.

FIG. 6 is an example of the amount of discharged fluid over time in an SLD (single-line design) printing method of the present invention. FIG. 6 shows A) printing of a logo (Cafe Box Delight logo) using chocolate pudding, B) printing of an emblem (UT Austin emblem) using minced beef, C) printing of rain using ketchup, and D) printing of a pelican using CBD-infused ketchup.

Figure 7:
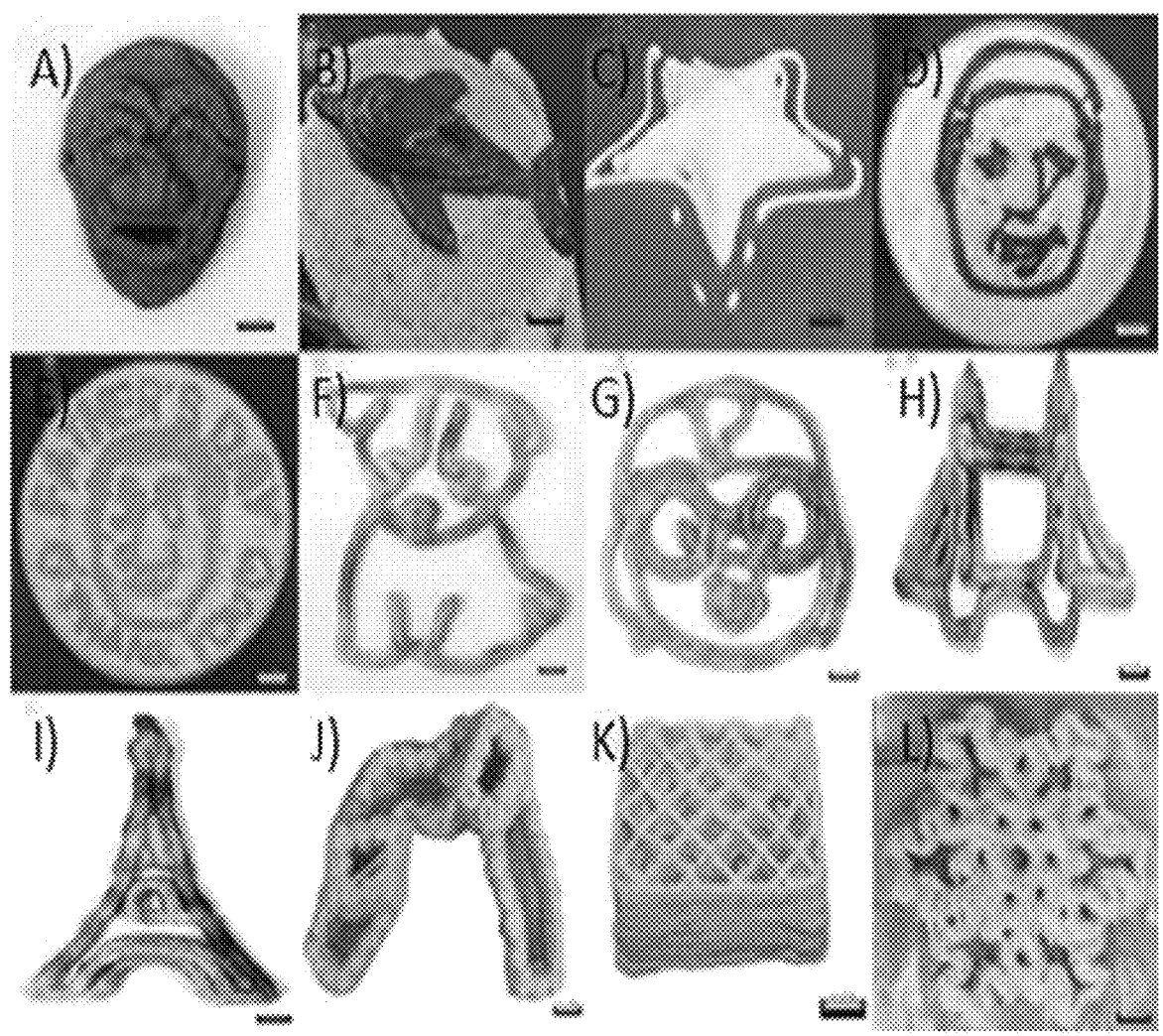
FIG. 7 is an example of a 3D object produced by SLD (single-line design) printing in a STE discharging method of the present invention.

FIG. 7 is an example of a 3D object produced by SLD (single-line design) printing in a STE discharging method of the present invention. FIG. 7 shows printing of A) a 3D chocolate chip, B) 3D chocolate pudding, C) 3D ice cream, D) 2D yogurt, E) 2D yogurt, F) cookie-dough, G) cookie-dough, H) cookie-dough, I) pizza dough, J) pizza dough, K) pizza dough, L) cookie-dough. Here, the cases of different shapes in the same name have different head speeds.

Figure 8:
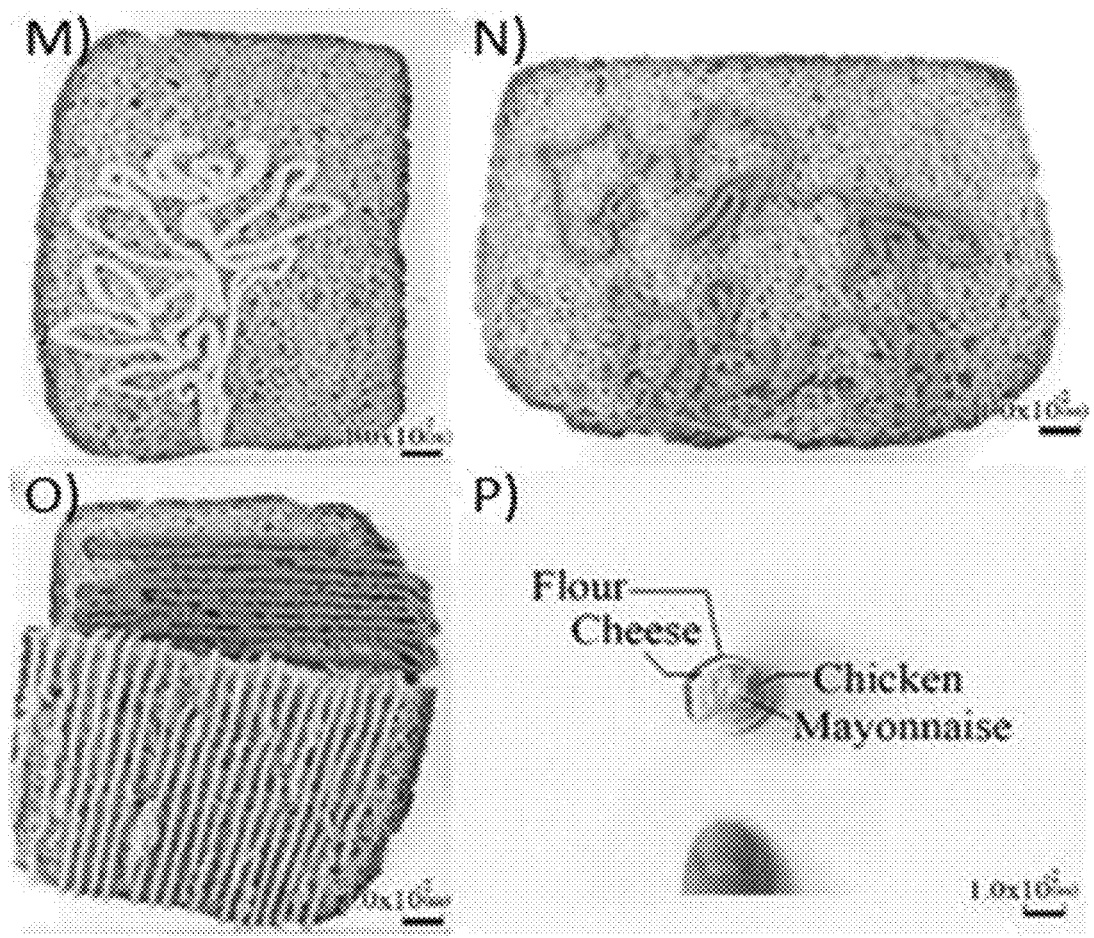
FIG. 8 is an example of a 3D object produced by SLD (single-line design) printing in a PTE discharging method of the present invention.

FIG. 8 is an example of a 3D object produced by SLD (single-line design) printing in a PTE discharging method of the present invention. FIG. 8 shows M) a flower pattern printed with chicken-containing sauce on bread, N) an animal pattern printed with beef-containing sauce on bread, O) horizontal/vertical line patterns printed with beef-containing sauce and avocado-containing sauce on bread, and P) printing of a hamburger with decorations of cheese, chicken, and mayonnaise printed on wheat bread.

As described above, the 3D printing operating system 500 of the present invention implements a teleportation concept-based drug delivery method enabling contactless remote diagnosis and, at the same time, delivery of drugs (delivery of a 3D object through relay of a server) such as CBD in an emergency situation such as the prevalence of coronaviruses (e.g., COVID-19) or various infectious diseases.

As described above, in the cloud operation platform 200, the CBD notification unit 220 may transmit, to the user terminal 300, CBD content-related information produced on the basis of the user information (e.g., an ID, a password, contact information, causal symptoms, etc.) or the specialist prescription information (e.g., an image or text information of prescription of specialists such as doctors/pharmacists, etc.) and control the user terminal 300 to transmit job data including the CBD content-related information to the remote 3D printer 100 through the network (S130). Accordingly, the 3D printer 100 produces an object having a corresponding CBD content according to the CBD content-related information using a CBD-containing fluid (S140). Here, the CBD content-related information may be information including a weight ratio (wt %) of CBD in the fluid for producing the object, or the volume of a fluid when the CBD content of the fluid is already known.

Additionally, in order to increase the absorption rate of CBD to the body through the teleportation delivery of the CBD-containing 3D object in the 3D printing operating system 500 of the present invention, the CBD-containing fluid discharged through the discharge units 85 and 95 may have an appropriate amount of animal fat or vegetable fat, thereby facilitating the action of micelles or inverse micelles. It was confirmed that an appropriate amount of animal fat or vegetable fat described above produces lipophilic and hydrophilic portions by the action of micelles or reverse micelles on CBD, thereby effectively defending against gastric acid attack in the stomach, and that the absorption rate of CBD in the body is increased by 4 to up to 14 times according thereto. In addition, since the fluid discharged through the discharge units 85 and 95 contains CBD, the CBD contained in the fluid may be adsorbed into the container so that the amount thereof may change. Therefore, it is desirable that all fluid receiving means (the fluid feeders 160 and 170, the discharge unit 85, the discharge unit 95, the pipe 172 (a hose, a tube, etc.) connected to the discharge unit 95, the nozzle, etc.) in the fluid movement path from the fluid feeders 160 and 170/discharge unit 85 to the nozzle for discharging the same are made of plastic that does not adsorb CBD to prevent CBD loss.

For example, the CBD-containing fluid containing an appropriate amount of animal fat or vegetable fat may be prepared using a supercritical carbon dioxide ($CO_2$) extraction method. For example, the amount of animal or vegetable fat may be controlled by a supercritical carbon dioxide extraction method in which a co-solvent such as water, ethanol, acetone, fatty oil, glycerin, etc. is used in food materials such as meat, beef, pork, vegetables, and the like, thereby facilitating the action of micelles or reverse micelles.

In addition, it is reported that CBD is oxidized, decomposed, and progressed rapidly by air as the temperature rises. Therefore, when CBD-containing food is delivered in this way, it is sensitive to oxidation in the air, and in particular, the higher the temperature, the faster the destruction of CBD. For example, in the case of printing an object in a shape such as a picture using the CBD-containing fluid on coffee, if the thickness of a foam is more than or equal to a predetermined thickness to suppress heat transfer, the absorption rate of CBD in the body may be increased. That is, before printing an object using the CBD-containing fluid on food having a predetermined temperature or higher (e.g., 50 degrees C. or higher) and containing coffee, a foam using the food (e.g., forming a foam having a predetermined thickness or more by dripping of coffee) or a heat transfer barrier layer using other foods (e.g., sprinkling salads such as onions, cabbages, etc., as a heat transfer barrier layer, on a warm pizza to have a predetermined thickness or more before printing ketchup, which is a CBD-containing fluid) may be performed, and then printing may be performed.

In addition, as described above, by printing a food, as an object using the CBD-containing fluid, directly on another food at room temperature, it is possible to reduce loss or destruction of CBD and to reduce oxidation time by printing quickly. In the case where an object using the CBD-containing fluid is packaged in a beverage can, etc., a lot of CBD loss can occur due to surface adsorption, so it is possible to reduce loss or destruction of CBD by printing an object using the CBD-containing fluid directly on other foods.

As described above, the 3D printing operating system 500 of the present invention may implement a teleportation concept-based drug delivery method enabling contactless remote diagnosis and, at the same time, delivery of drugs (delivery of a 3D object through relay of a server) such as CBD in an emergency situation such as the prevalence of coronaviruses (such as COVID-19) or various infectious diseases, and thus, apart from the undergoing clinical trials, it may become a useful CBD usage/delivery method to many users experiencing difficulties relating to tic disorders, sleep disorders, epilepsy in children and the alleviation of pain caused by various diseases. The 3D printing operating system 500 of the present invention may produce the shape of a CBD-containing object for various foods such as beer, wine, makgeolli, etc., as well as coffee, salad, cakes, and ice cream, in addition to general food, depending on user preferences, and provide CBD-containing foods, etc. by the remote printing method.

As described above, according to the 3D printing operating system 500 of the present invention, it is possible to provide CBD-containing foods, such as coffee, juice, syrup, sauce, ice cream, yogurt, chocolate, cookies, candies, pretzels, pastas, etc., or CBD-containing products using a fluid, such as candles (scented candles), soaps, cosmetics, oils, etc., by printing the same into various and distinctive shapes catering to consumer preferences, while enabling quantitative control and verification so as to contain an amount of CBD legally allowed in each country. For example, when adding CBD ingredients that may be misused to food or the like, it is possible to share and manage, depending on the environment, information such as users, managers, and families in relation to whether or not the user and the manager use the effective and right amount of CBD, how much CBD is used maximally including overdose, and the like using the Internet of things (IoT) system in the 3D printer, and to alleviate unnecessary misunderstandings and reluctance in the process of injection into the elderly or children by adding the right amount of CBD to a fluid or the like, instead of absorbing and taking an inaccurate amount for one dose using a patch or dropper, thereby making it easy to recognize the accurate amount of use. That is, the CBD-containing fluid can be verified at the production site of the 3D objects in conjunction with the IoT system, and, in particular, information transmission and control are possible such that the right amount of CBD is to be contained even for the neglected class of people such as children or the elderly and even in remote locations far away between countries or regions, thereby enabling effective control by the government or the like.

In addition, it is possible to print and eat CBD-containing foods anytime and anywhere and to prevent situations in which CBD may be misused using a technique in which information thereof is stored in a cloud server and a prescribed amount to be taken for one dose can be accurately controlled by the recommendation of specialists who agree to access the information, such as doctors, pharmacists, families, and the like, which makes it possible to focus on the function of nutraceuticals rather than drugs. In addition, information on the foods and the like repeatedly consumed and feedback information thereof are provided through a mounted panel during the printing time. Even if a dosage per day is determined by a doctor's prescription, there is a risk of abuse due to a single intake, so, according to the present invention, the dosage per day can be controlled and managed through a cloud server, leading to a safe and healthy CBD food culture. It also makes it possible to eat normally without being aware of other people looking at one and without hiding it, and to be freed from the psychological pressure that comes from controlling oneself.

In addition, the present invention can be only a method applicable to a platform in the field of collecting data to be applied to the causal symptoms and medical statistics in the processes of initial delivery of the CBD-containing foods or the like, taking the same, the stage requiring follow-up management, and a free diffusion stage. That is, it may provide a tool of collecting a large amount of data at the stages of initial entry according to initial management, data analysis and environmental changes around the world therefor, and full acceptance, and it is possible to reduce reluctance by taking CBD in the form of foods, instead of injections or patches, and to easily obtain and provide meaningful data to be applied to causal symptoms, medical statistics, and the like.

The cloud operation platform 200 according to an embodiment of the present invention may be implemented as hardware, software, or a combination thereof. For example, it may be implemented as a computing system having at least one processor for performing the above functions. Such a computing system may include at least one processor, a memory, a user interface input device, a user interface output device, storage, and a network interface, which are connected via a bus. The processor may be a central processing unit (CPU) or a semiconductor device that processes instructions stored in the memory and/or storage. The memory and storage may include various types of volatile or nonvolatile storage media. For example, the memory may include ROM (read only memory) and RAM (random access memory).

Accordingly, the steps of the method or algorithm described in connection with the embodiments disclosed herein may be directly implemented by hardware, software module, or a combination of the two, which are executed by the processor. The software module may reside in a storage medium (i.e., the memory and/or storage) such as RAM memory, flash memory, ROM memory, EPROM memory, EEPROM memory, registers, hard disks, removable disks, and CD-ROM. The exemplary storage medium may be coupled to the processor, and the processor may read information from the storage medium and write information thereto. Alternatively, the storage medium may be integral with the processor. The processor and storage medium may reside within an application specific integrated circuit (ASIC). The ASIC may reside within a user terminal. Alternatively, the processor and storage medium may reside as separate components within the user terminal.

In addition, the functions used for processing input/output data of the 3D printing operating system 500, the cloud operation platform 200, etc. according to an embodiment of the present invention may be implemented as computer-readable code in a computer-readable recording medium, and may be implemented to input, output, and display data or information necessary for performing functions by combining the recording medium and a device such as a computer. The computer-readable recording medium includes all types of recording devices in which data readable by a computer system is stored. Examples of the computer-readable recording medium include storage media such as ROM, RAM, CD-ROM, magnetic tapes, floppy disks, optical data storage devices, hard disks, removable storage devices, and the like. In addition, the computer-readable recording medium may be implemented as a form in which a computer-readable code, which is distributed through computer systems connected through a network (e.g., the Internet, a mobile communication network, etc.) is stored in a distribution manner, and may be executed through the network.

As described above, Although the present invention has been described with specific matters such as specific elements, etc., and limited embodiments and drawings, these are provided only to help the overall understanding of the present invention, and the present invention is not limited to the above embodiments, and various modifications and variations can be made without departing from the essential characteristics of the present invention by those of ordinary skill in the art to which the present invention pertains. Therefore, the spirit of the present invention should not be limited to the described embodiments, and all technical ideas with equal or equivalent modifications to the claims, as well as the claims to be described later, should be construed as being included in the scope of the present invention.

The invention claimed is:

1. A 3D printing operating system comprising:
an authentication unit configured to perform user authentication for determining whether or not to allow services for corresponding user information or specialist prescription information according to a request from a user terminal;
a CBD notification unit configured to transmit CBD content-related information produced on the basis of the user information or specialist prescription information to the user terminal so that the user terminal transmits job data including the CBD content-related information to a remote 3D printer through a network, and control printing to produce an object having a corresponding CBD content using a fluid;
a communication support unit configured to support the exchange of two-way remote communication information, including voice or text, between a specialist terminal and the user terminal while the 3D printer produces the object; and
an interface unit configured to manage a history of the use and effect of the CBD-containing object produced by the 3D printer corresponding to a causal symptom for each user in a database, analyze the use and effect of the CBD-containing object of a specific user or users for each causal symptom according to a request for statistic, and provide statistical information.

2. The 3D printing operating system of claim 1, wherein the authentication unit is configured to perform the user authentication by identifying whether or not user identification information included in the request matches the user information or specialist prescription information, and perform additional authentication through communication with a management agency server.

3. The 3D printing operating system of claim 1, wherein the CBD notification unit is configured to transmit, as the CBD content-related information, information including a weight ratio of CBD in the fluid for producing the object or a volume of the fluid when the CBD content of the fluid is known in advance.

4. The 3D printing operating system of claim 1, wherein the fluid for producing the object contains 0.001 wt % to 95.0 wt % of CBD.

5. The 3D printing operating system of claim 1, wherein the fluid for producing the object contains 0.0 wt % to 10.0 wt % of THC.

6. The 3D printing operating system of claim 1, wherein the communication support unit is configured to extract, as the two-way remote communication information, a description of the use and effect of the CBD-containing object corresponding to the user's causal symptom with reference to the database, provide the same to the user terminal, and support interactive exchange of question and answer information about the symptom improvement status of the user between the specialist terminal and the user terminal.

7. The 3D printing operating system of claim 1, wherein the 3D printer comprises:

a printer device configured to discharge a material through a nozzle of a discharge unit coupled to an xy driving unit according to a control signal;

a control device configured to generate the control signal so that the printer device produces an object on a bed in which a keep-warm/keep-cold mechanism is installed according to the job data ordered through the user terminal; and a camera configured to obtain an image of the process of producing the object, and wherein the control device is configured to execute the job data by interworking with the user terminal according to the relay of the CBD notification unit of the platform on the network, provide the image of the process of producing the object to the user terminal in real time, control the interface unit of the platform to provide analysis information on the process of producing the object to the user terminal in real time, and control one or more of x-axis or y-axis movement of the discharge unit, z-axis movement of the bed, a change in the discharge material, and operation stop according to a control command received from the user terminal.

8. The 3D printing operating system of claim 7, wherein the control device is configured to control the movement of the discharge unit according to digital data on pictures, design, photos, text, or information input by writing or drawing by hand, as job data, so as to discharge, through the discharge unit, the CBD-containing fluid on the bed or further discharge the same on a predetermined substructure, thereby producing the object.

9. The 3D printing operating system of claim 7, further comprising a fluid feeder configured to supply the CBD-containing fluid through the discharge unit, wherein the discharge unit discharges the CBD-containing fluid through a nozzle in a PTE (Piston Type Extrusion) or STE (Screw Type Extrusion) method.

10. The 3D printing operating system of claim 7, wherein the material of the fluid feeder for supplying the CBD-containing fluid through the discharge unit and fluid receiving means from the fluid feeder to the nozzle are made of plastic to prevent loss of CBD in the movement path of the CBD-containing fluid.

11. The 3D printing operating system of claim 1, wherein the CBD-containing fluid used for producing the object in the 3D printer is obtained by a supercritical carbon dioxide extraction method, and contains animal or vegetable fat for a predetermined micelle or reverse micelle action.

12. The 3D printing operating system of claim 1, wherein, in the 3D printer, the object is produced using a CBD-containing fluid on coffee in which a foam is formed on the coffee by a predetermined thickness or more.

13. The 3D printing operating system of claim 1, wherein, in the 3D printer, the object, which is food, is produced using a CBD-containing fluid on other foods.

14. The 3D printing operating system of claim 1, wherein, in the 3D printer, the object is produced using a CBD-containing fluid on the food in which a heat transfer barrier layer having a predetermined thickness or more is formed on the food.

* * * * *